H. W. ROBINSON.
Improvement in Rotary-Harrows.

No. 130,748.    Patented Aug. 20, 1872.

Witnesses
Thomas Brown,
Chas Purdy Street

Inventor
Henry W. Robinson,
By G. L. Chapin,
Atty

UNITED STATES PATENT OFFICE.

HENRY W. ROBINSON, OF WOODSTOCK, ILLINOIS.

IMPROVEMENT IN ROTARY HARROWS.

Specification forming part of Letters Patent No. 130,748, dated August 20, 1872.

SPECIFICATION.

I, HENRY W. ROBINSON, of Woodstock, in the county of McHenry and State of Illinois, have invented a new and useful Improvement in Rotary Harrows, of which the following is a specification:

The present invention relates to an improvement on rotary harrows patented to me January 23, 1872, and numbered 122,911. A difficulty in operating said patented harrows consisted in the tendency which one section of the harrow had to rotate on the periphery of the harrows when turning round in the field, there being no means provided to prevent such a movement. The nature of this improvement consists in bracing the two sections of the harrow to hold them down to their work, and also hold them in position to rotate when they are to be moved to and from a field, as the whole is hereinafter fully described and shown.

Figure 1:
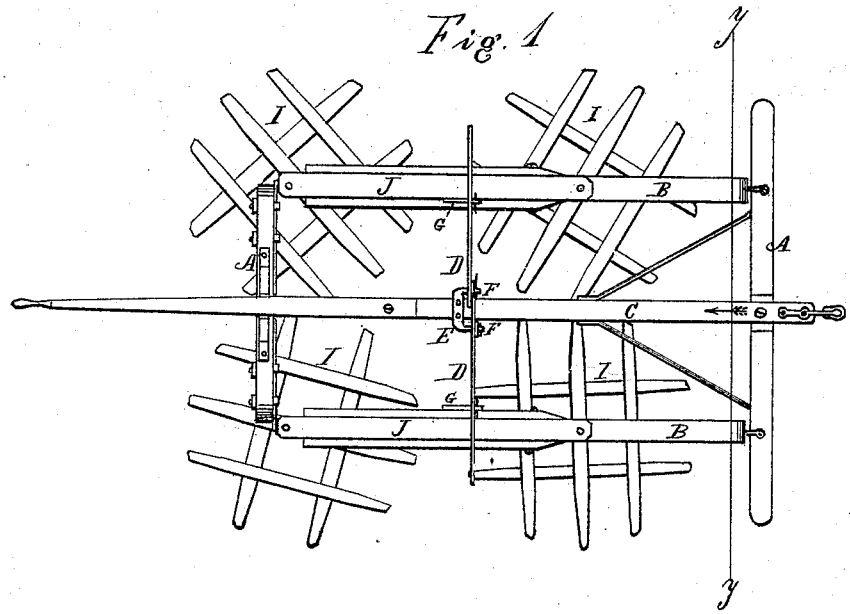
Figure 2:
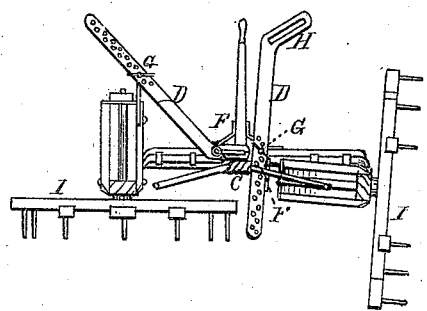

In the drawing, Figure 1 is a plan or top view of my improved harrow; Fig. 2, a transverse section thereof taken on line $y\ y$, Fig. 1.

A A represent the front and rear frame of the harrow, to which the beams B are hung as in the patent referred to, only they are hung lower down to prevent tilting. The harrows I are pivoted to the rotating parts or beams B in substantially the same manner, the elevated parts or frames J J supporting the upper ends of said pivots or spindles. The means for holding the harrows I down to their work consists of braces D, which are slotted at their lower ends so as to have short sliding movements on pins F F, formed on the ends of a plate, E, which is fastened to a central beam, C, and which are provided at their upper ends with a series of holes, in any one of which may be inserted a pin, G, fastened to the elevated part J. By this means the harrows cannot turn upon their edges when being turned round; but, at the same time, by means of the sliding of the braces at their lower ends, the harrows have the required movement to tilt on uneven soil. To hold the harrows to rotate on their edges or peripheries, the braces D are removed from the pins G F, and turned end for end, as shown at the right half of Fig. 2, and after the pivots of the harrows are brought to about a horizontal position, and the harrows are upright, the pins G F are put in the proper holes in the braces, and fastened there by keys or otherwise. The harrow can then be drawn to or from a field.

I disclaim the arrangement of the rotating harrows in the patent referred to; but

I claim—

The combination of the braces D D, constructed as set forth, with the beams B and elevated parts J, and central handle C, substantially as and for the purpose set forth.

HENRY W. ROBINSON.

Witnesses:
HENRY M. FOOTE,
O. B. FLANDERS.